United States Patent
Carlill

(10) Patent No.: US 7,849,834 B2
(45) Date of Patent: Dec. 14, 2010

(54) METHOD AND APPARATUS FOR CONTROLLING EMISSIONS FROM INTERNAL COMBUSTION ENGINES

(75) Inventor: Thomas W. Carlill, Peterborough (GB)

(73) Assignee: Perkins Engine Company Limited, Peterborough (GB)

( * ) Notice: Subject to any disclaimer, the term of this patent is extended or adjusted under 35 U.S.C. 154(b) by 117 days.

(21) Appl. No.: 12/003,005

(22) Filed: Dec. 19, 2007

(65) Prior Publication Data
US 2008/0162019 A1 Jul. 3, 2008

(30) Foreign Application Priority Data
Dec. 21, 2006 (EP) .................................. 06126955

(51) Int. Cl.
F02B 3/00 (2006.01)
F02D 41/14 (2006.01)
F02M 69/04 (2006.01)
F02M 69/54 (2006.01)
F02M 25/06 (2006.01)

(52) U.S. Cl. .................. 123/299; 123/300; 123/443; 123/445; 123/463; 60/278; 701/108; 701/104

(58) Field of Classification Search ............... 123/569, 123/299, 300, 58.8, 568.14, 452, 434, 445, 123/463, 568, FOR. 127, 443
See application file for complete search history.

(56) References Cited

U.S. PATENT DOCUMENTS

| | | | | |
|---|---|---|---|---|
| 4,106,448 A | * | 8/1978 | Noguchi et al. | 123/268 |
| 4,453,379 A | * | 6/1984 | Kawamura et al. | 60/278 |
| 5,218,937 A | * | 6/1993 | Matsura | 123/301 |
| 5,782,226 A | * | 7/1998 | Gartner | 123/568.13 |
| 5,803,048 A | * | 9/1998 | Yano et al. | 123/443 |
| 6,357,224 B1 | * | 3/2002 | Kawamoto et al. | 60/277 |
| 6,367,319 B2 | * | 4/2002 | Hartke et al. | 73/114.76 |
| 2002/0112692 A1 | * | 8/2002 | Abo et al. | 123/295 |

FOREIGN PATENT DOCUMENTS

| | | |
|---|---|---|
| DE | 198 44 085 | 3/2000 |
| EP | 1 589 207 | 10/2005 |

OTHER PUBLICATIONS

European Search Report and Opinion dated Jun. 4, 2007, for Application No. 06126955.1 (6 pages).

* cited by examiner

*Primary Examiner*—Stephen K Cronin
*Assistant Examiner*—Raza Najmuddin
(74) *Attorney, Agent, or Firm*—Finnegan, Henderson, Farabow, Garrett & Dunner LLC

(57) ABSTRACT

An internal combustion engine is provided with a control arrangement for influencing exhaust gas pressures and the level of In-Cylinder-Charge-Dilution (ICCD) so as to provide cycles with different emission characteristics. The exhaust gas pressure may be influenced by adjusting a combustion parameter between various cycles. The adjustment of the combustion parameter may, for example, include an adjustment of the injection timing, a change in shot mode, or a change in fuel quantity. By making such adjustments, cycle-to-cycle exhaust gas pressure variations may be introduced so as to influence future combustion events and reduce overall emissions and noise levels.

33 Claims, 4 Drawing Sheets

|  | Cycle | | | | | |
|---|---|---|---|---|---|---|
|  | 1 | 2 | 1 | 2 | 1 | 2 |
| Cylinder 1 | C | C | C | C | C | C |
| Cylinder 2 | C | C | C | C | C | C |

*Fig. 4*

|  | Cycle | | | | | |
|---|---|---|---|---|---|---|
|  | 1 | 2 | 1 | 2 | 1 | 2 |
| Cylinder 1 | B | A | B | A | B | A |
| Cylinder 2 | A | B | A | B | A | B |

*Fig. 5*

|  | Cycle | | | | | |
|---|---|---|---|---|---|---|
|  | 1 | 2 | 1 | 2 | 1 | 2 |
| Cylinder 1 | B | B | A | B | B | A |
| Cylinder 2 | A | A | B | A | A | B |

*Fig. 6*

|  | Cycle | | | | | |
|---|---|---|---|---|---|---|
|  | 1 | 2 | 1 | 2 | 1 | 2 |
| Cylinder 1 | B | A | B | A | B | A |
| Cylinder 2 | C | C | C | C | C | C |
| Cylinder 3 | A | B | A | B | A | B |

*Fig. 7*

|  | Cycle | | | | | |
|---|---|---|---|---|---|---|
|  | 1 | 2 | 1 | 2 | 1 | 2 |
| Cylinder 1 | B | A | B | A | B | A |
| Cylinder 2 | A | B | A | B | A | B |
| Cylinder 3 | A | B | A | B | A | B |
| Cylinder 4 | B | A | B | A | B | A |

*Fig. 8*

METHOD AND APPARATUS FOR CONTROLLING EMISSIONS FROM INTERNAL COMBUSTION ENGINES

CROSS-REFERENCED TO RELATED APPLICATIONS

This application is the continuation of European Patent Application No. 06126955.1, filed on Dec. 21, 2006, and the disclosure of which is hereby incorporated by reference in its entirety.

TECHNICAL FIELD

This disclosure relates to internal combustion engines and more particularly, to a method and apparatus for controlling emissions from internal combustion engines.

BACKGROUND

Modern internal combustion engines with compression ignition are commonly controlled such that a portion of exhaust gas is mixed with clean intake air to improve emissions performance. This technique is known as In Cylinder Charge Dilution (ICCD). Using ICCD, i.e., introducing exhaust gas back into the combustion chamber, has a particularly positive influence on the emission levels of various nitrogen oxides, commonly referred to as $NO_x$. However, the introduction of exhaust gas tends to have a negative influence on the level of particulate matter (PM) resulting from the combustion. This balance between $NO_x$ and PM, in relation to the introduction of certain levels of exhaust gas, is known as the PM-$NO_x$ trade-off. Both PM and $NO_x$ emissions are the subject of stringent regulations. Controlling the amount of exhaust gas transferred back into the combustion chamber is a significant factor in ensuring that both PM and $NO_x$ levels are within regulation limits. It would therefore be beneficial to exert control over the amount of exhaust gas transferred into the combustion chamber.

One known method of providing exhaust gas to the combustion chamber is by opening an exhaust valve during an intake stroke of the piston so that previously expelled exhaust gas is transferred back from the exhaust manifold into the combustion chamber. Various mechanical arrangements are known to enable opening of the exhaust valve and to be able to vary the intake of exhaust gas to a certain extent. A common solution is to provide an additional cam surface on a camshaft so as to open the exhaust valve.

However, such arrangements are inflexible in that it is not possible to select a mode in which no exhaust gas is taken back into the combustion chamber, a mode which may be desirable during transient states of the engine. In addition, it is not possible to influence the amount of exhaust gas taken back in.

The present disclosure is directed to one or more improvements in the existing technology.

SUMMARY

In a first aspect, a method of controlling an internal combustion engine is provided. The internal combustion engine includes a plurality of combustion chambers, at least one exhaust manifold and at least one exhaust valve for each of the plurality of combustion chambers for selectively fluidly connecting each of the plurality of combustion chambers with the at least one exhaust manifold. The method includes running a first cycle, the first cycle including injecting fuel into at least one of the plurality of combustion chambers in accordance with at least one first injection parameter, combusting the fuel thereby creating exhaust gas, opening at least one exhaust valve to transfer exhaust gas from at least one of the plurality of combustion chambers to the at least one exhaust manifold, thereby influencing a first exhaust gas pressure in the exhaust manifold, enabling a transfer of exhaust gas from the exhaust manifold to at least one of the plurality of combustion chambers and using the first exhaust gas pressure to achieve a first desired level of at least one emission parameter during a combustion event. The method further includes running a second cycle, the second cycle including injecting fuel into at least one of the plurality of combustion chambers in accordance with at least one second injection parameter, combusting the fuel thereby creating exhaust gas, opening at least one exhaust valve to transfer exhaust gas from at least one of the plurality of combustion chambers to the at least one exhaust manifold, thereby influencing a second exhaust gas pressure in the exhaust manifold different from the first exhaust gas pressure, enabling a transfer of exhaust gas from the exhaust manifold to at least one of the plurality of combustion chambers and using the second exhaust gas pressure to achieve a second desired level of at least one emission parameter during a combustion event. The method further includes repeating the first and second cycles while adjusting the first and second at least one injection parameters to achieve different exhaust gas pressures between the first and second cycles.

In a second aspect, a method of controlling an internal combustion engine during a steady state operation is provided. The internal combustion engine includes at least one combustion chamber, an exhaust manifold and at least one exhaust valve for selectively fluidly connecting the at least one combustion chamber with the exhaust manifold. The method includes causing at least a first and a second combustion event in at least one cylinder, the at least first and second combustion events having at least one combustion characteristic. The method also includes actuating at least one exhaust valve to influence the exhaust gas pressure in the exhaust manifold by transferring exhaust gas from the at least one cylinder to the exhaust manifold. The method also includes adjusting the at least one combustion characteristic between the first and second combustion events so as to influence the exhaust gas pressure in the exhaust manifold.

In a third aspect, a method of controlling an internal combustion engine including running the internal combustion engine during a steady state operation is provided. The method includes modifying a combustion characteristic during the steady state operation to influence an exhaust gas pressure. The method also includes influencing a future combustion event by using the influenced exhaust gas pressure.

In a fourth aspect, an internal combustion engine is provided. The internal combustion engine includes a plurality of combustion chambers, at least one exhaust manifold and at least one exhaust valve for each of the plurality of combustion chambers for selectively fluidly connecting each of the plurality of combustion chambers with the at least one exhaust manifold. The internal combustion engine also includes a fuel arrangement and at least one controller configured to run a first cycle, the first cycle including injecting fuel into at least one of the plurality of combustion chambers in accordance with at least one first injection parameter, combusting the fuel thereby creating exhaust gas, opening at least one exhaust valve to transfer exhaust gas from at least one of the plurality of combustion chambers to the at least one exhaust manifold, thereby influencing a first exhaust gas pressure in the exhaust manifold, enabling a transfer of exhaust gas from the exhaust manifold to at least one of the plurality of combustion chambers and using the first exhaust gas pressure to achieve a first desired level of at least one emission parameter during a combustion event; run a second cycle, the second cycle including injecting fuel into at least one of the plurality of combustion chambers in accordance with at least one second injection parameter, combusting the fuel thereby creating exhaust gas, opening at least one exhaust valve to transfer exhaust gas from at least one of the plurality of combustion chambers to the at least one exhaust manifold, thereby influencing a second exhaust gas pressure in the exhaust manifold different from the first exhaust gas pressure, enabling a transfer of exhaust gas from the exhaust manifold to at least one of the plurality of combustion chambers and using the second exhaust gas pressure to achieve a second desired level of at least one emission parameter during a combustion event; and repeat the first and second cycles while adjusting the first and second at least one injection parameters to achieve different exhaust gas pressures between the first and second cycles.

BRIEF DESCRIPTION OF THE DRAWINGS

FIG. 4 is a representation of a standard injection parameter map for an internal combustion engine such as that of FIG. 1; and FIGS. 5-8 are representations of injection parameter maps that may replace, or be overlaid on top of, the standard map of FIG. 4.

DETAILED DESCRIPTION

Figure 1:
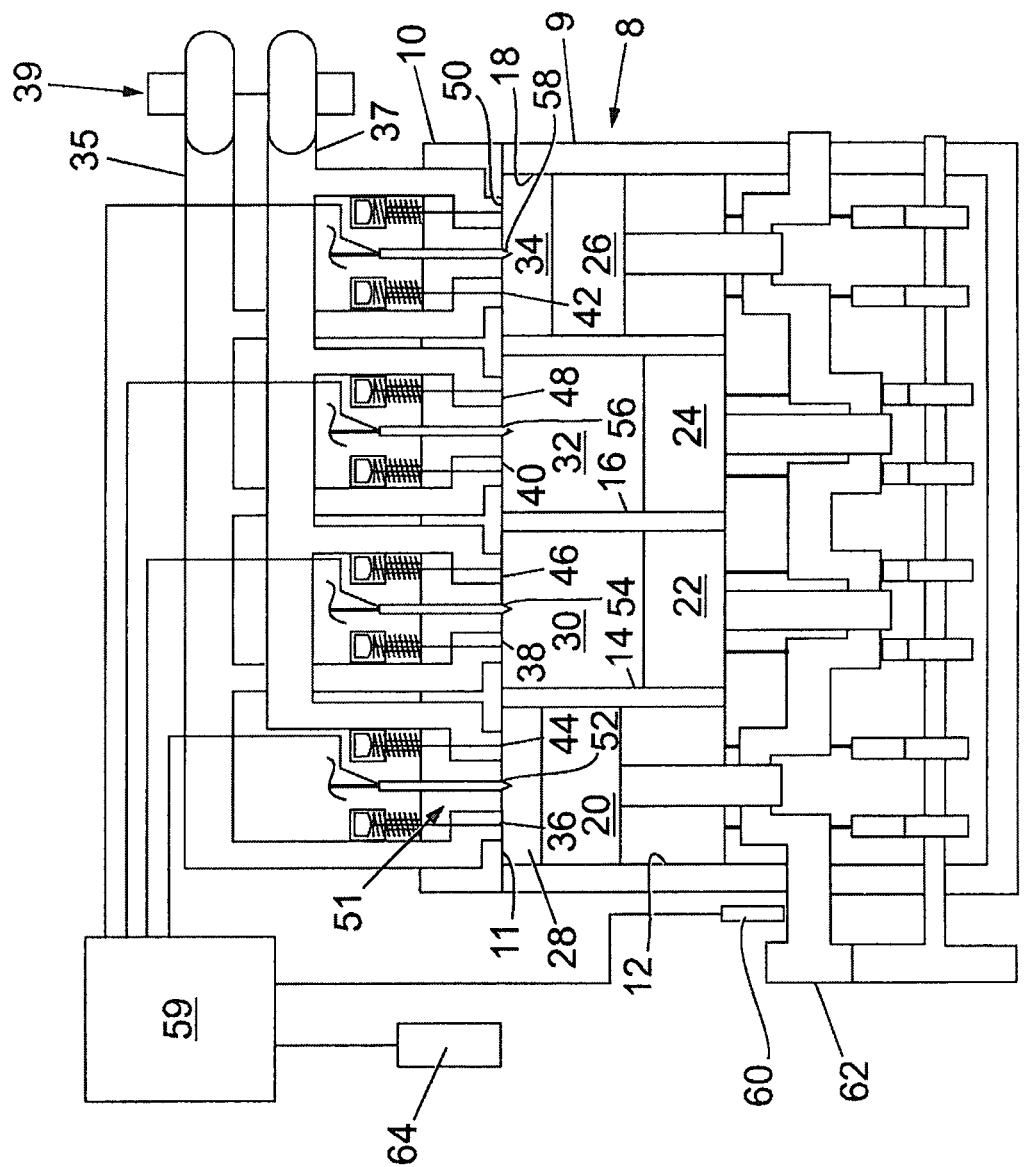
FIG. 1 is a diagrammatic representation of an embodiment of an internal combustion engine.

FIG. 1 illustrates an exemplary embodiment of an engine 8 having a cylinder block 9 and a cylinder head 10. The engine 8 may be an internal combustion engine having any number of cylinders. In this example, a four cylinder engine is depicted having first, second, third and fourth cylinders 12, 14, 16, and 18, respectively. The engine 8 may be of the compression ignition type without any ignition devices such as spark plugs, but it will be understood that engine 8 may be any other suitable type of engine. Each of the cylinders 12-18 may have an associated first, second, third and fourth piston 20, 22, 24, 26 housed at least partially in its respective cylinder, thereby forming four combustion chambers 28, 30, 32, 34 whereby an upper boundary of the combustion chambers 28-34 may be formed by a lower surface 11 of the cylinder head 10.

Each cylinder 28-34 may have at least one inlet valve 36, 38, 40, 42 and at least one exhaust valve 44, 46, 48, 50. The inlet and exhaust valves 36-42 and 44-50 may be selectively opened and closed by any suitable actuation mechanism such as, for example, a camshaft arrangement (not shown) whereby the camshaft rotates and actuates the various valves so as to open them. However, the valves 36-50 may be opened by any other suitable expedient such as electronic actuators. Alternatively, other style valves, such as rotary valves, may be used. The inlet valves 36-42 may be selectively operated to form a fluid connection between the combustion chambers 28-34 and an inlet manifold 35.

The exhaust valves 44-50 may selectively be operated to form a fluid connection between the combustion chambers 28-34 and an exhaust manifold 37. Both the inlet and exhaust manifolds 35 and 37 may have a single piece or multi piece construction. For example, the multi piece construction is a technique commonly used for engines having six cylinders or more. A turbocharger arrangement generally designated as 39, which may for example be a conventional turbocharger or a series of turbochargers, may be provided.

Each of the cylinders 12-18 may be provided with a fuel arrangement generally designated as 51 and may include fuel injectors 52, 54, 56, 58. The fuel arrangement 51 and the fuel injectors 52-58 may be of any suitable kind such as, for example, a common rail system, and may include mechanically or hydraulically actuated electronic unit injectors. In one embodiment the fuel arrangement 51 may be controlled by a controller 59 which may include more than one controller, such as, for example, a network of controllers.

The controller 59 may receive a variety of inputs to enable it to control the fuel arrangement 51, other functions of the engine 8, and the surrounding components and systems of the engine 8. In one embodiment the controller 59 may receive a speed signal from a sensor 60 which may, for example, sense the rotational speed of a crankshaft 62. In one embodiment the controller 59 may receive a signal from an operator input device 64 such as, for example, an accelerator pedal. The controller 59 may receive further inputs such as, for example, engine load, oil pressures, emission data, gas pressures in the various manifolds, etc. The controller 59 may include software enabling it to execute a method of controlling the internal combustion engine 8 as described below.

INDUSTRIAL APPLICABILITY

The engine 8 may be described as being an engine running on a four stroke compression ignition principle with the four strokes being defined as a compression stroke, a power stroke, an exhaust stroke, and an intake stroke. However, it is to be understood that the principle of this disclosure may be applied to any suitable engine, including gas, petrol, and heavy fuel engines, and those engines running on the two stroke principle. For convenience, the method will initially be described for one cylinder only, but it is to be understood the principle equally applies to multiple cylinders.

During use, the engine 8 may be controlled by the controller 59. The controller 59 may control the fuel arrangement 51, for example the fuel injector 52, so as to inject fuel into the first combustion chamber 28. The injection of fuel together with the availability of combustion air may lead to a combustion mixture ready for a first combustion event, thereby producing exhaust gas having certain levels of $NO_x$ and particulate matter. Each fuel injection may have at least one combustion characteristic associated with it. In one embodiment the combustion characteristic may be a particular valve parameter or an injection parameter as will be elaborated upon below.

The exhaust gas may be expelled by the first piston during at least a portion of the exhaust stroke whereby the exhaust valve 44 may be selectively and at least partially opened so as to form a fluid connection between the first combustion chamber 28 and the exhaust manifold 37. The exhaust gas entering the exhaust manifold 37 may cause an exhaust gas pressure in the exhaust manifold 37, whereby the exhaust manifold 37 may be tuned to influence the pattern of gas pressure waves in the exhaust manifold 37. The term gas pressure may be interpreted as being a mean gas pressure over any suitable period of time such as, for example, the period for one piston to undergo all four strokes, the period for more than one piston to go through their four cycles, or the period for all pistons to go through their four cycles.

During operation the engine 8 may be controlled using ICCD such that a portion of the exhaust gas is being returned from the exhaust manifold 37 to the first combustion chamber 28 and mixed with the combustion mixture to exert some control over the emissions caused by the combustion. To effect such transfer of exhaust gas to the combustion chamber 37, the exhaust valve 44 may be selectively and at least partially lifted during, for example, the intake stroke of the first piston 20. Due to the pressure differential between the first combustion chamber 28 and the exhaust manifold 37, exhaust gas may flow back into the first combustion chamber 28. A higher pressure in the exhaust manifold 37 may therefore lead to a greater amount of exhaust gas flowing back into the combustion chamber.

Figure 2:
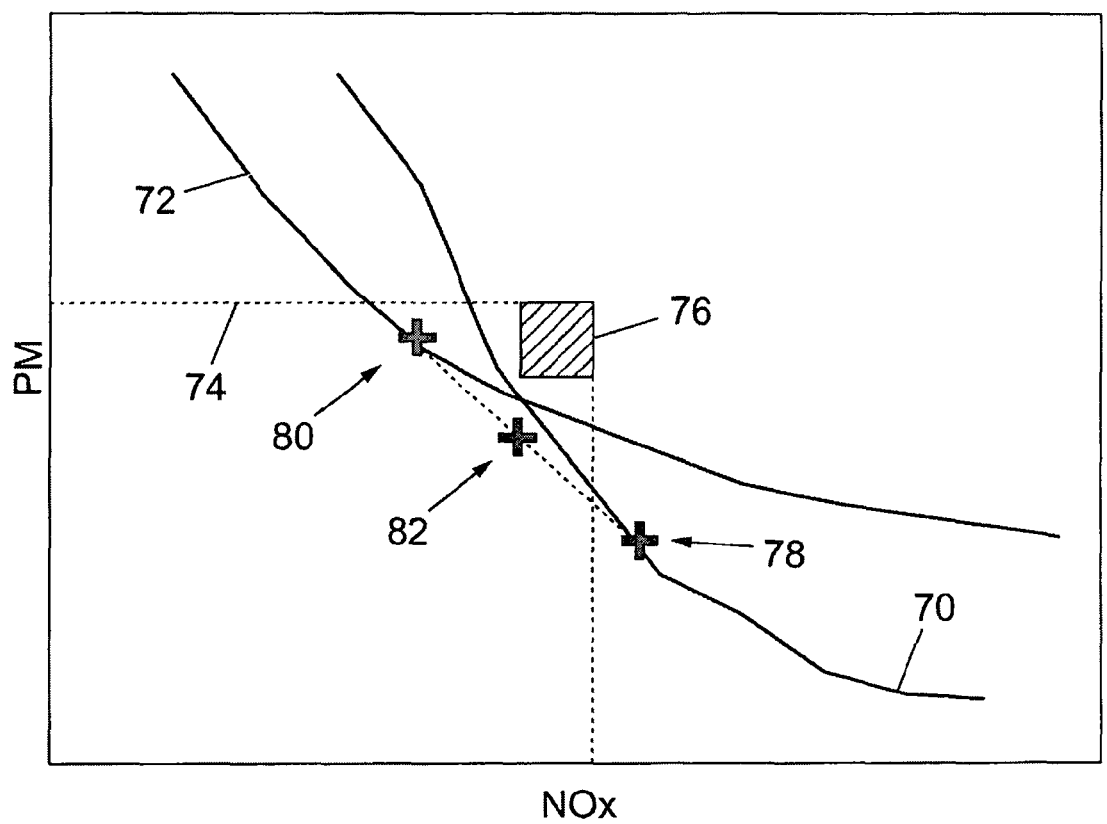
FIG. 2 illustrates an example of an emission chart relating to the internal combustion engine of FIG. 1.

Using the exemplary chart of FIG. 2, the effect of applying ICCD to combustion processes will be explained in more detail. The levels of $NO_x$ and PM are represented on the X and Y axes, respectively. The curve 70 represents an engine emission curve corresponding to an operation wherein the engine 8 is being run in a first mode without or with low levels of ICCD. The curve 72 represents an engine running with a higher level of ICCD as compared to the engine running in accordance with the curve 70. The box 74 is a representation of the definition of all those $NO_x$ and PM values that are acceptable, for example, according to regulations or legislation.

It can be seen that a reduction in $NO_x$ tends to lead to an increase in PM and vice versa, hence the term PM-$NO_x$ tradeoff. A typical optimized point may be located somewhere in the area 76 which may be an acceptable compromise for various operating conditions, and may be achieved by running a compromise level of ICCD. It is to be understood that it may be preferred to run certain levels of ICCD only when the engine is operating in a steady state. A steady state in this context may be interpreted as a state in which the load on the engine 8 and the speed of the engine 8 does not change substantially over a particular period of time, and in which the engine is operating at a substantially constant or steady state temperature. During a transient state, i.e., a state in which either the engine load or speed changes, ICCD may be switched off, or at least reduced.

As discussed above each combustion event may have at least one combustion characteristic such as an injection parameter. In one embodiment the injection parameter may be the injection timing. Injection timing tends to influence the exhaust gas pressure in the exhaust manifold. For example, a standard fuel injection may take place at 2 degrees before top dead center (TDC) and may lead to a standard exhaust gas pressure. Retarding the injection timing tends to raise the exhaust gas pressure relative to the standard pressure, whereas advancing the injection timing tends to lower the exhaust gas pressure relative to the standard pressure.

In one embodiment the injection parameter may be the injection shot mode. The injection shot mode may vary from a single shot to a combination of several shots which may be of equal or unequal duration, quantity, or intensity, for example. Certain injection shot modes tend to influence the exhaust gas pressure in the exhaust manifold. For example, a fuel injection based on multiple shots may increase the exhaust gas pressure more than a fuel injection based on a single shot.

In one embodiment, the injection parameter may be the injection quantity. Injection quantity also tends to influence the exhaust gas pressure in the exhaust manifold. For example, a higher quantity of injected fuel tends to increase the exhaust gas pressure more than a lower quantity of injected fuel.

It can therefore be seen that varying the injection timing, the injection shot mode, and the injection quantity may influence the exhaust gas pressure in the exhaust manifold 37, and hence the level of ICCD for future combustion events.

The combustion characteristic also may be a valve parameter of the exhaust valve 44. In one embodiment the valve parameter may be the valve lift, i.e., the height a valve is lifted off its seat. The greater the lift, the more ICCD tends to occur. In another embodiment, the valve parameter may be the valve lift rate, i.e., how fast valve lift and the acceleration and deceleration of the exhaust valve 44 occur. A high lift rate may lead to the valve opening coinciding with certain pressure differentials between the exhaust manifold 37 and the first combustion chamber manifold 28.

In one embodiment, the valve parameter may be the duration of the valve being open, whereby longer open periods tend to increase the level of ICCD. In one embodiment, the valve parameter may be the valve lift mode. The valve lift mode may be interpreted as the opening pattern of the exhaust valve 44. As the exhaust valve 44 may be restricted in periods of opening, for example to avoid a clash with the first piston 20, the exhaust valve may be actuated following opening patterns accordingly. For example, the exhaust valve may be kept fully open, may be kept open with a reduced valve lift, or may be opened several times. In one embodiment, the valve parameter may be the valve timing which may influence the level of ICCD as it may coincide with a particular pressure differential between the exhaust manifold 37 and the first combustion chamber 28.

It is to be understood that the combustion characteristics may be mixed in order to achieve particular emission levels while accommodating all other demands, such as power output, responsiveness, fuel economy, physical conditions, etc.

Figure 3:
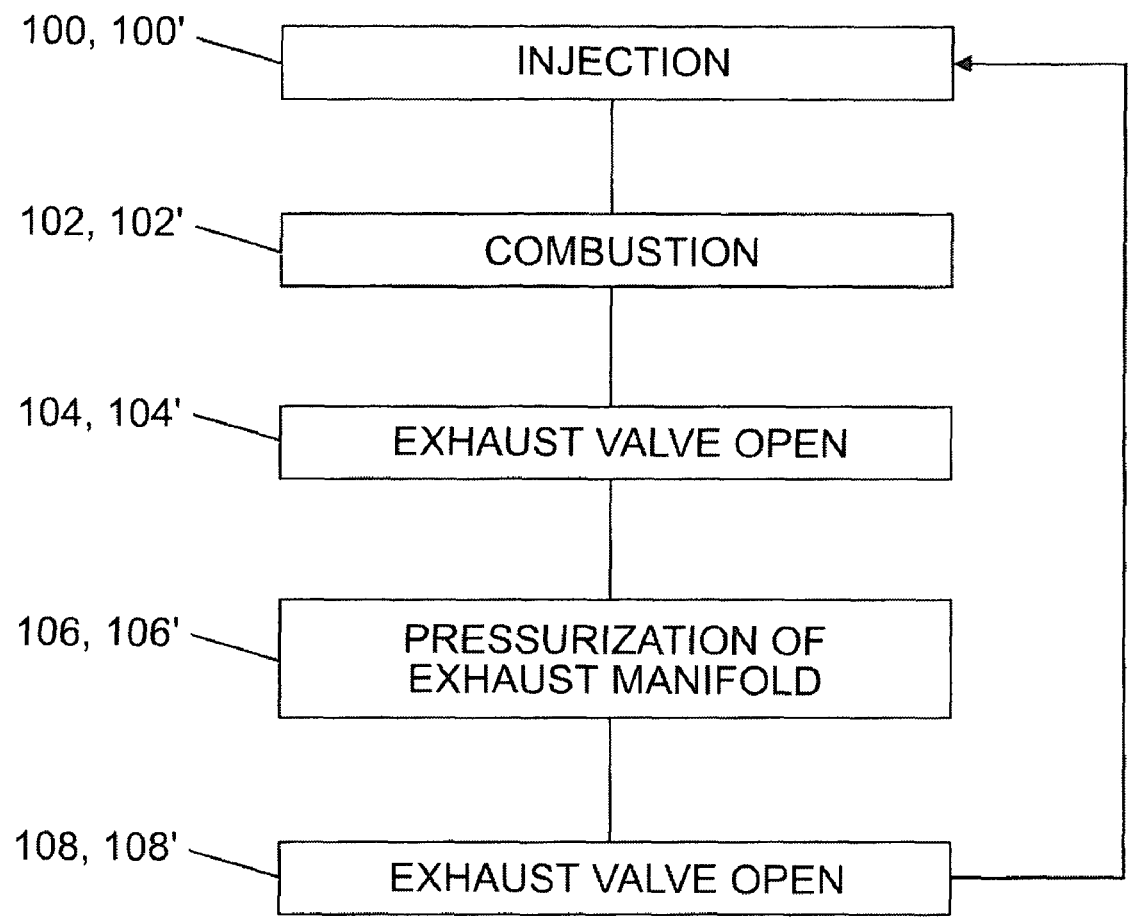
FIG. 3 is a flow chart relating to a control method for the internal combustion engine of FIG. 1.

Now referring to FIG. 3, an exemplary control of the engine 8 may be as follows. The description will refer to cycles, and it is to be understood that a cycle may mean the period between two similar events in the same cylinder or between two similar events between two or more cylinders.

In step 100 a first cycle fuel injection having at least one injection parameter may take place in the first combustion chamber 28 so as to enable a first combustion event. The fuel is combusted in step 102 thereby creating exhaust gas. The exhaust valve 44 may open in step 104 so as to enable a transfer of exhaust gas to the exhaust manifold. The exhaust gas entering the exhaust manifold may cause a pressurization of the exhaust manifold in step 106 which may be expressed as a mean exhaust gas pressure over the duration of the first cycle. Subsequently the exhaust valve 44 may stay open or may re-open in step 108 to allow a transfer of exhaust gas back from the exhaust manifold 37 into the combustion chamber 28 to achieve ICCD so as to move to a first desired level of at least one emission parameter such as $NO_x$ or PM during a next combustion event. The first desired level may be represented by a marker 78 which is positioned on the curve 70, for example (FIG. 2).

To create the next combustion event in a second cycle the steps 100-108 may be repeated to form steps 100'-108' whereby at least one injection parameter may be adjusted. For example, the injection timing may be retarded such that during step 106' the exhaust manifold is pressurized to a higher level as compared to step 106. A higher pressure in the exhaust manifold may increase the level of ICCD as explained above and may be represented by the marker 80 on the curve 72, for example (FIG. 2). It can be seen that during the first cycle a lower level of PM is achieved, but the level of $NO_x$ may not be satisfactory. During the second cycle, a lower level of $NO_x$ may be achieved, but the PM performance has deteriorated. However, on average a level of $NO_x$ and PM is achieved that corresponds to the marker 82 indicated in FIG.

2. It can be seen that by using this strategy the new optimized point, indicated by marker 82, corresponds to both lower levels of both $NO_x$ and PM than the previous optimized point which was located in the area 76.

Hence by adjusting the exhaust pressure in the exhaust manifold 37 between a first cycle and a second cycle an average level of ICCD may be achieved giving better results than running cycles with the same injection parameter. It can therefore be seen that it may be desirable to repeatedly adjust the injection parameter between a first and a second cycle even when the engine is running in a steady state operation so as to achieve favorable emission results.

It is of course to be understood that various other factors may influence the pattern of variation in the injection parameter, as the other factors may also influence exhaust gas pressures and pressure waves. For example, the number of cylinders per manifold, the presence of a turbocharger, the tuning of the manifold, etc., may all play a role in the exhaust gas pressure in the exhaust manifold.

FIG. 4 shows an exemplary standard map for a two cylinder engine run in a steady state whereby the injection parameters are not adjusted from cycle to cycle. This map may be used in situations where no, or a low level of, ICCD is desired, for example. The value "C" may be interpreted as an injection timing of 2 degrees before TDC, for example.

FIG. 5 shows an exemplary tuning map for the same two cylinder engine as FIG. 4 whereby this tuning map may be overlaid on top of the standard map of FIG. 4. The "A" may correspond to an advanced injection and the "B" may correspond to a retarded injection. It can be seen that in this example the injection parameter is adjusted from cycle to cycle for the same cylinder and from cycle to cycle between two cylinders. Because in this example the third cycle is identical to first cycle, the third cycle may actually be regarded as being the first cycle. Hence adjustment of the injection parameter may take place repeatedly between the first and the second cycle, i.e., from the first cycle to the second cycle and from the second cycle to the first cycle.

FIG. 6 shows an alternative exemplary tuning map whereby an additional third cycle may take place between the first and second cycle. When moving between the first and the third cycle it may be desirable not to adjust the injection parameter, but only to adjust the injection parameter between the third and the second cycle.

FIG. 7 shows an exemplary tuning map for a three cylinder engine having a firing order of cylinder 1, cylinder 2 and cylinder 3. In this example the second cylinder always runs in standard mode whereby the first and the third cylinder undergo injection parameter adjustments from cycle to cycle.

FIG. 8 shows an exemplary tuning map for a four cylinder engine having a firing order of cylinder 1, cylinder 3, cylinder 4, cylinder 2. Since the exhaust gas pressure from the combustion event in cylinder 1 may mainly affect the subsequent combustion event, i.e., the second cycle that takes place in cylinder three, it is between the combustion events in cylinder one and three that a parameter adjustment may take place. As explained above it is not only injection timing that may influence the exhaust pressure in the exhaust manifold 37, but also shot mode and injection quantity may play a role. The maps shown in FIGS. 4-8 may therefore be interpreted as being shot mode maps or fuel quantity maps. For example, in the map of FIG. 5 the value "A" may represent a single shot, and value "B" may represent multiple shots. In the case where maps shown in FIGS. 4-8 may be fuel quantity maps, the value "C" may, for example, represent a standard quantity, the value "A" may represent a quantity equal to the standard quantity plus 5 milliliters, and value "B" may represent a quantity equal to the standard quantity minus 5 milliliters.

It is to be understood that variations may be made, for example variations in complexity, by adding multiple levels of variations, such as not only varying between advancing and retarding, but also varying levels of advancement and retardation. The standard map also may be replaced by any of the tuning, the shot mode and the fuel quantity maps, and the various maps may also be stacked relative to one another to enable further variations, for example.

By repeatedly varying at least one combustion characteristic such as an injection parameter, noise emission may also be improved as the likelihood of resonance in the exhaust manifold 37 is reduced due to the number of adjustments made in the exhaust pressure, and hence the exhaust pressure waves.

It will be apparent to those skilled in the art that various modifications and variations can be made to the disclosed method and apparatus for controlling emissions from internal combustion engines without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A method of controlling an internal combustion engine, the internal combustion engine having a plurality of combustion chambers, at least one exhaust manifold, and at least one exhaust valve for each of said plurality of combustion chambers for selectively fluidly connecting each of said plurality of combustion chambers with said at least one exhaust manifold, the method comprising:

running a first cycle, the first cycle including:
injecting fuel into at least one of the plurality of combustion chambers in accordance with at least one first injection parameter;
combusting the fuel thereby creating exhaust gas;
opening at least one exhaust valve to transfer exhaust gas from at least one of the plurality of combustion chambers to the at least one exhaust manifold, thereby influencing a first exhaust gas pressure in the exhaust manifold;
enabling a transfer of exhaust gas from the exhaust manifold to at least one of the plurality of combustion chambers, using the first exhaust gas pressure to achieve a first desired level of at least one emission parameter during a combustion event; and running a second cycle, the second cycle including:
injecting fuel into at least one of the plurality of combustion chambers in accordance with at least one second injection parameter different from the at least one first injection parameter;
combusting the fuel thereby creating exhaust gas;
opening at least one exhaust valve to transfer exhaust gas from at least one of the plurality of combustion chambers to the at least one exhaust manifold, thereby influencing a second exhaust gas pressure in the exhaust manifold different from the first exhaust gas pressure;
enabling a transfer of exhaust gas from the exhaust manifold to at least one of the plurality of combustion chambers, using the second exhaust gas pressure to achieve a second desired level of at least one emission parameter during a combustion event; and repeating the first and second cycles, wherein repeating the first and second cycles includes repeatedly modifying an amount of exhaust gas transferred into the at least one combustion chamber by changing to the respective at least one first or second injection parameter.

2. The method according to claim 1, wherein repeating the first and second cycles includes repeating the cycles to achieve different desired levels of the at least one emission parameter.

3. The method according to claim 1, wherein the exhaust gas pressures are the mean exhaust gas pressures per cycle.

4. The method according to claim 1, wherein the at least one injection parameter relates to fuel injection timing and adjusting the injection parameter includes retarding or advancing the fuel injection timing.

5. The method according to claim 1, wherein the at least one injection parameter relates to fuel shot mode and adjusting the injection parameter includes injecting a single shot of fuel per combustion event.

6. The method according to claim 1, wherein the at least one injection parameter relates to fuel shot mode and adjusting the injection parameter includes injecting multiple shots of fuel per combustion event.

7. The method according to claim 1, wherein the at least one injection parameter relates to fuel quantity and adjusting the injection parameter includes increasing or decreasing the fuel injection quantity.

8. The method according to claim 1, wherein adjusting the at least one injection parameter includes adjusting at least two of the parameters relating to fuel injection timing, fuel injection shot mode and fuel injection quantity.

9. The method according to claim 1, wherein one of the first and second cycles relates to a first combustion chamber, and the other of the first and second cycles relates to the same first combustion chamber.

10. The method according to claim 1, wherein the at least one combustion chamber includes first and second combustion chambers and one of the first and second cycles relates to the first combustion chamber, and the other of the first and second cycles relates to the second combustion chamber.

11. The method according to claim 1, wherein at least one additional cycle is run between the first and second cycles in which the injection parameter is not adjusted from its preceding cycle.

12. The method according to claim 1, wherein the method further includes selecting either a first mode in which the injection parameter is adjusted between the first and second cycles or a second mode in which the injection parameter is not adjusted between the first and second cycles.

13. The method according to claim 1, wherein the at least one emission parameter relates to the level of NOx in the exhaust gas.

14. The method according to claim 1, wherein the at least one emission parameter relates to the level of particulate matter in the exhaust gas.

15. The method according to claim 1, wherein the at least one emission parameter includes two emission parameters, the first emission parameter relating to the level of NOx in the exhaust gas and the second parameter relating to the level of particulate matter in the exhaust gas.

16. The method according to claim 15, wherein one of the level of NOx and the level of particulate matter is increased, and the other one of the level of NOx and the level of particulate matter is decreased between the first and second cycles.

17. A method of controlling an internal combustion engine during a steady state operation, the internal combustion engine having at least one combustion chamber, an exhaust manifold and at least one exhaust valve for selectively fluidly connecting the at least one combustion chamber with the exhaust manifold, the method comprising:
    causing a first combustion event in at least one cylinder, the first combustion event having at least one combustion characteristic;
    actuating at least one exhaust valve to provide a first exhaust gas pressure in the exhaust manifold by transferring exhaust gas from the at least one cylinder to the exhaust manifold;
    using the first exhaust gas pressure to achieve a first desired level of a first emission parameter during a second combustion event, the second combustion event having the at least one combustion characteristic;
    adjusting the at least one combustion characteristic between the first and second combustion events;
    causing the second combustion event in the at least one cylinder;
    actuating the at least one exhaust valve to transfer exhaust gas from the at least one cylinder to the exhaust manifold to change the first exhaust gas pressure to a second exhaust gas pressure in the exhaust manifold;
    repeating the first combustion event and the second combustion event, wherein repeating the first and second combustion events includes repeatedly modifying an amount of exhaust gas transferred into the at least one cylinder using the first or second exhaust gas pressure by changing the at least one combustion characteristic; and
    using the second exhaust gas pressure to achieve a first desired level of a second emission parameter during the first combustion event.

18. The method according to claim 17, wherein the first and second exhaust gas pressures are mean exhaust gas pressures.

19. The method according to claim 17, further including causing at least a third combustion event in the at least one cylinder, the at least a third combustion event taking place between the first and second combustion events, whereby the at least one combustion characteristic is unaltered between the first and third combustion event.

20. The method according to claim 19, wherein the combustion characteristic is a valve parameter.

21. The method according claim 20, wherein the valve parameter is at least one of: a) the valve lift; b) the valve lift rate; c) the duration of the valve being open; d) the valve lift mode, and e) the valve timing.

22. The method according to claim 17, wherein the combustion characteristic is an injection parameter.

23. The method according claim 22, wherein the injection parameter is at least one of; a) the injection timing, b) the injection shot mode, and c) the injection quantity.

24. An internal combustion engine, comprising:
    a plurality of combustion chambers;
    at least one exhaust manifold and at least one exhaust valve for each of the plurality of combustion chambers configured to selectively fluidly connect each of the plurality of combustion chambers with the at least one exhaust manifold;
    a fuel arrangement; and
    at least one controller configured to:
        run a first cycle, the first cycle including:
            injecting fuel into at least one of the plurality of combustion chambers in accordance with at least one first injection parameter;
            combusting the fuel thereby creating exhaust gas;
            opening at least one exhaust valve to transfer exhaust gas from at least one of the plurality of combustion chambers to the at least one exhaust manifold, thereby influencing a first exhaust gas pressure in the exhaust manifold; and
enabling a transfer of exhaust gas from the exhaust manifold to at least one of the plurality of combustion chambers, using the first exhaust gas pressure to achieve a first desired level of at least one emission parameter during a combustion event; and configured to
run a second cycle, the second cycle including:
injecting fuel into at least one of the plurality of combustion chambers in accordance with at least one second injection parameter different from the at least one first injection parameter;
combusting the fuel thereby creating exhaust gas;
opening at least one exhaust valve to transfer exhaust gas from at least one of the plurality of combustion chambers to the at least one exhaust manifold, thereby influencing a second exhaust gas pressure in the exhaust manifold different from the first exhaust gas pressure; and
enabling a transfer of exhaust gas from the exhaust manifold to at least one of the plurality of combustion chambers, using the second exhaust gas pressure to achieve a second desired level of at least one emission parameter during a combustion event; and configured to
repeat the first and second cycles, while repeatedly modifying an amount of exhaust gas transferred into the at least one combustion chamber by changing to the respective at least one first or second injection parameter.

25. An internal combustion engine, comprising:
a plurality of combustion chambers;
at least one exhaust manifold and at least one exhaust valve for each of the plurality of combustion chambers configured to selectively fluidly connect each of the plurality of combustion chambers with the at least one exhaust manifold;
a fuel arrangement; and
at least one controller configured to:
cause a first combustion event in at least one cylinder, the first combustion event having at least one combustion characteristic;
actuate at least one exhaust valve to provide a first exhaust gas pressure in the exhaust manifold by transferring exhaust gas from the at least one cylinder to the exhaust manifold;
use the first exhaust gas pressure to achieve a first desired level of a first emission parameter during a second combustion event, the second combustion event having the at least one combustion characteristic;
adjust the at least one combustion characteristic between the first and second combustion events;
cause the second combustion event in the at least one cylinder;
actuate the at least one exhaust valve to transfer exhaust gas from the at least one cylinder to the exhaust manifold to change the first exhaust gas pressure to a second exhaust gas pressure in the exhaust manifold;
repeat the first combustion event and the second combustion event, while repeatedly modifying an amount of exhaust gas transferred into the at least one cylinder using the first or second exhaust pressure by changing the at least one combustion characteristic; and
use the second exhaust gas pressure to achieve a first desired level of a second emission parameter during the first combustion event.

26. The method according to claim 17, wherein the first emission parameter relates to the level of NOx in the exhaust gas.

27. The method according to claim 17, wherein the first emission parameter relates to the level of particulate matter in the exhaust gas.

28. The method according to claim 17, wherein the first emission parameter relates to the level of NOx in the exhaust gas and the second parameter relates to the level of particulate matter in the exhaust gas.

29. The method according to claim 1, wherein the valve lift and the duration of the valve being open for the at least one exhaust valve are substantially constant between the first and second cycles.

30. A method of controlling an internal combustion engine, the internal combustion engine having a plurality of combustion chambers, and at least one exhaust valve for each of said plurality of combustion chambers, the method comprising:
running a first cycle, the first cycle including:
injecting fuel into at least one of the plurality of combustion chambers in accordance with at least one first injection parameter,
combusting the fuel thereby creating exhaust gas, and
enabling a transfer of exhaust gas having a first exhaust gas pressure to at least one of the plurality of combustion chambers to achieve a first desired level of at least one emission parameter during a combustion event;
running a second cycle, the second cycle including:
injecting fuel into at least one of the plurality of combustion chambers in accordance with at least one second injection parameter different from the at least one first injection parameter,
combusting the fuel thereby creating exhaust gas, and
enabling a transfer of exhaust gas having a second exhaust gas pressure to at least one of the plurality of combustion chambers to achieve a second desired level of the at least one emission parameter during a combustion event, the first exhaust gas pressure being different from the second exhaust gas pressure; and
repeating the first and second cycles in an alternating manner, wherein repeating the first and second cycles includes repeatedly modifying an amount of exhaust gas transferred into the at least one combustion chamber by changing to the respective at least one first or second injection parameter.

31. The method according to claim 30, wherein the valve lift and the duration of the valve being open for the at least one exhaust valve are substantially constant between the first and second cycles.

32. The method according to claim 30, wherein the quantity of fuel injected in the first cycle is substantially the same as the quantity of fuel injected in the second cycle.

33. The method according to claim 30, wherein the first and second cycles are each repeated at least two times such that the first and second cycles alternate with a maximum of one cycle inbetween.

* * * * *